United States Patent

Horton

Patent Number: 5,700,171
Date of Patent: Dec. 23, 1997

[54] SPEED CONTROL SYSTEM

[75] Inventor: Eric P. Horton, Fall River, Canada

[73] Assignee: Perfect Pass Control Systems Incorporation, Dartmouth, Canada

[21] Appl. No.: 549,283

[22] Filed: Oct. 27, 1995

[51] Int. Cl.[6] ............................................. B60K 41/00
[52] U.S. Cl. ............................................. 440/87; 180/170
[58] Field of Search ..................... 440/1, 2, 87; 180/170, 180/171, 178, 177, 179; 361/236, 239, 249

[56] References Cited

U.S. PATENT DOCUMENTS

| | | | |
|---|---|---|---|
| 3,590,938 | 7/1971 | Gurol | 180/108 |
| 4,159,753 | 7/1979 | Boche | 180/177 |
| 4,759,731 | 7/1988 | Uchida et al. | 440/1 |
| 4,872,857 | 10/1989 | Newman et al. | 440/1 |
| 4,966,247 | 10/1990 | Masuda | 180/170 |
| 5,074,810 | 12/1991 | Hobbs et al. | 440/2 |
| 5,110,310 | 5/1992 | Hobbs | 440/1 |

*Primary Examiner*—Jesus D. Sotelo
*Attorney, Agent, or Firm*—Deveau, Colton & Marquis

[57] ABSTRACT

A speed controller for vehicle comprises speed sensors which output to a controller which in turn outputs to a servo motor. The servo is connected to the inner cable of a co-axial cable, the outer sheath of which is lodged between a buttress and the engine throttle. The distance between the buttress and the engine throttle lever is, at least when the throttle is closed, shorter than the length of the outer sheath such that the outer sheath obtains a curved configuration. The inner cable extends beyond the engine throttle lever to a support. Accordingly, when the controller operates the servo to draw in the inner cable, the outer sheath is urged to straighten and, thereby, push against the engine throttle lever to open it. Conversely, when the inner cable is paid out, the outer sheath is relaxed to allow the engine throttle lever to close.

14 Claims, 2 Drawing Sheets

SPEED CONTROL SYSTEM

BACKGROUND OF THE INVENTION

1. Field of the Invention

The present invention relates to apparatus for use in a vehicle speed controller and a method for controlling the speed of a vehicle.

2. Description of the Related Art

In high level water skiing competition events, the skier must be pulled through the ski run at a pre-set speed. If the time through a run indicates the speed was outside a predetermined tolerance, the run is disqualified. It requires a high degree of skill on the part of the operator of the watercraft to meet the speed requirements.

U.S. Pat. No. 5,074,810 to Hobbs et al. describes a speed control system for a boat having particular utility for maintaining the speed of the boat during water skiing competition events. In Hobbs, after an operator adjusts the speed of a watercraft to a desired speed, a button is pressed which causes a control circuit to take over and maintain the desired speed of the boat by way of a speed control actuator positioned between the hand throttle and the engine throttle. The control circuit receives a pressure signal proportional to the speed of the craft from a pitot tube and pressure transducer. The control circuit compares the desired speed with the speed represented by the pressure signal and sends a control signal to an actuator connected to the engine throttle in order to make appropriate adjustments. In a second mode of operation, an operator may accelerate the boat to close to a speed stored in memory and then push a button to set the stored speed as the desired speed, whereupon the control circuit takes over to attain and maintain this speed.

A drawback with the Hobbs system is that an operator must focus on accelerating the boat to close to a desired speed and must also interact with the system prior to its activation, all at a time when there are many demands on the operator. Furthermore, there is a risk of a runaway throttle condition should the actuator fail.

The subject of invention seeks to overcome drawbacks of other systems.

SUMMARY OF THE INVENTION

According to the present invent ion, there is provided apparatus for use in a vehicle speed controller, comprising: an actuator; a co-axial cable having an outer sheath for extending between a buttress and an engine throttle lever and an inner cable operatively associated with said actuator and extending through said sheath to a support positioned beyond said engine throttle lever; said outer sheath being relatively incompressible along its longitudinal axis and relatively flexible transversely of its longitudinal axis, said sheath having a length greater than the distance between said buttress and said engine throttle lever, at least when said engine throttle lever is in a closed throttle position; and a controller for receiving an input by a speed sensor and outputting a control signal to said actuator.

According to another aspect of the present invention, there is provided a method for controlling the speed of a vehicle, comprising the following steps: (a) accepting an operator input of a set speed when a current speed of said vehicle is less than said set speed; (b) after accepting an operator input of a set speed, refraining from controlling the current speed of said vehicle while said current speed of said vehicle remains less than said set speed; (c) when an engine throttle for said vehicle is opened by said operator and said vehicle reaches approximately said set speed, providing an indication to said operator; and (d) thereafter adjusting said engine throttle in order to maintain the speed of said vehicle within a pre-selected tolerance from said set speed.

BRIEF DESCRIPTION OF THE DRAWINGS

In the drawings which disclose an example embodiment of the invention.

DETAILED DESCRIPTION OF THE PREFERRED EMBODIMENTS

Figure 1:
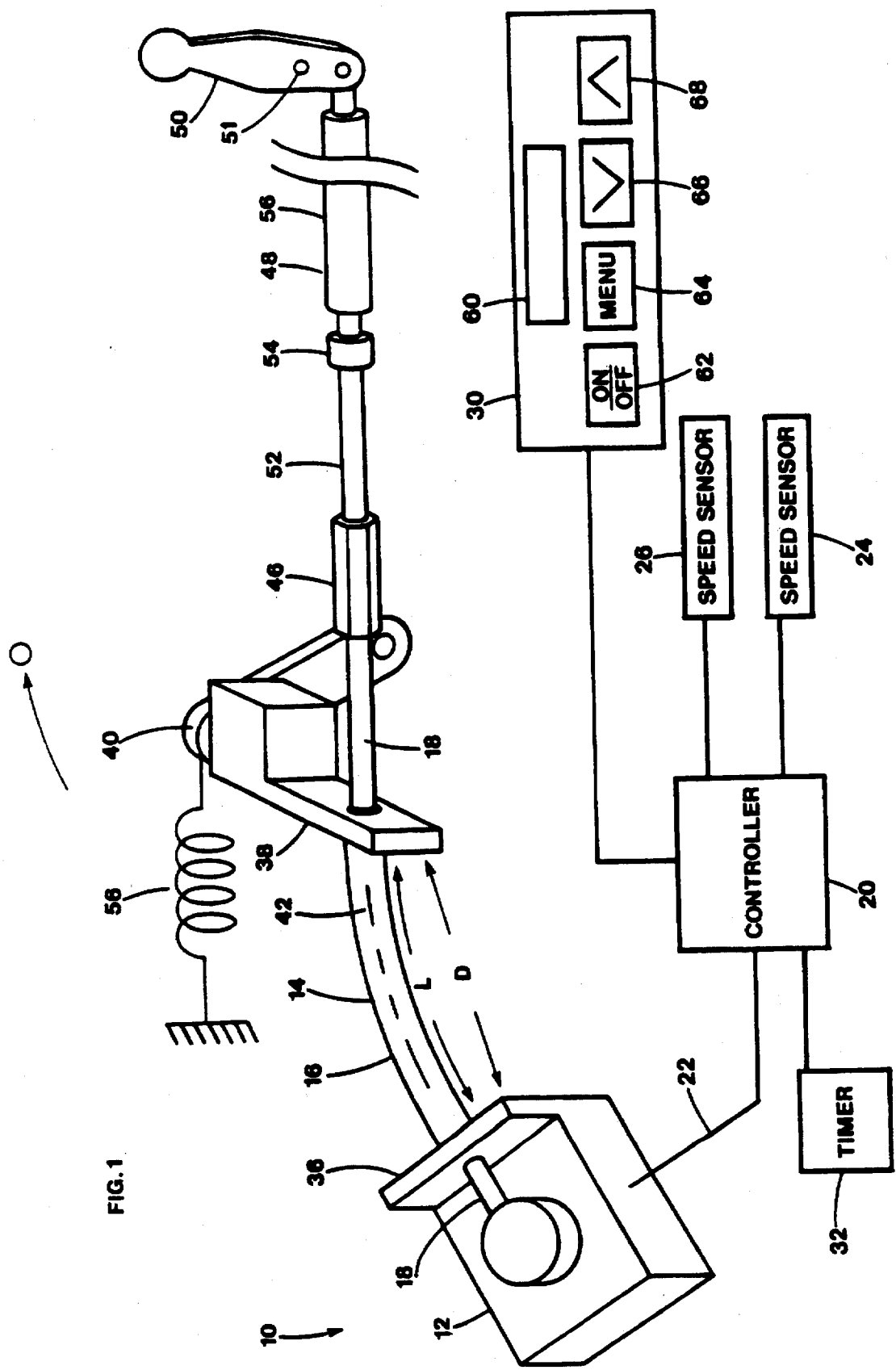
FIG. 1 is a partially perspective view of a speed control system made in accordance with this invention.

Turning to FIG. 1, a speed control system 10 made in accordance with this invention comprises an actuator in the nature of servo motor 12, a co-axial cable 14 having an outer sheath 16 and an inner cable 18, and a controller 20 operatively connected to the servo motor 12 by line 22. The controller receives an input from speed sensors 24 and 26 and from timer 32. The speed sensors may comprise pitot tubes and pressure transducers. The controller is connected for two-way communication with an input panel and display 30.

The outer sheath 16 of co-axial cable 14 extends between a buttress 36 on the housing of the servo drive 12 and a bracket 38 which is joined to the engine throttle lever 40. The outer sheath is relatively incompressible along its longitudinal axis 42 and is relatively flexible transversely of its longitudinal axis. This characteristic is typical of many commercially available co-axial cables wherein the outer sheath comprises an inner, helically wound, metal strip and an outer layer comprises a plastic covering.

When the engine throttle lever 40 is in a throttle closed position, as illustrated in FIG. 1, the length, L, of sheath 16 is greater than the distance D between the buttress 36 and the engine throttle lever 40. This is due to the curve in the sheath.

The inner cable 18 of co-axial cable 14 is operatively joined to the servo motor 12. The inner cable extends from the servo motor 12 through an opening in buttress 36, through outer sheath 16, and through an opening in bracket 38 to a nut 46 into which it is threaded. The nut 46 is an abutment which, for reasons which will become apparent hereinafter, acts as an adjustable stop.

A hand throttle is supported by a pivot 51. One end of an inner cable 52 of a co-axial cable 48 is joined to the hand throttle 50 proximate pivot 51. The other end of inner cable 52 is threaded to nut 46. The outer sheath 56 of the co-axial cable is fixed in position. A stop member 54 fixed on the hand throttle inner cable 52 limits the degree to which the hand throttle 50 may move the engine throttle lever 40 in a throttle opening direction, O. A spring 56 biases the engine throttle lever 40 to a throttle closed position.

Operation with the system 10 deactivated proceeds as follows. Should an operator pull back on hand throttle 50, the hand throttle inner cable 52 will slide in a forward direction such that stop member 54 and nut 46 move toward the sheath 56. Because one end of inner cable 18 of co-axial cable 14 is joined to nut 46, inner cable 18 is also pulled forwardly. However, the other end of cable 18 is joined to the inactive servo motor 12. The inactive servo motor will not pay out cable. Consequently, a stretching force is applied to cable 18 which will result in cable 18, and therefore sheath 16, between buttress 36 and bracket 38 becoming straighter. However, since the outer sheath 16 is relatively incompressible along its length, as the outer sheath straightens, it will push against bracket 38 to move the bracket, and therefore the engine throttle lever 40, in a throttle opening direction, O. Similarly, if the operator moves the hand throttle 50 in a throttle closing direction such that stop 54 moves away from sheath 48, cable 18 is relaxed so that sheath 16 is free to assume a more curved position. Consequently, sheath 16 will allow bracket 38 to move in a throttle closing direction under the influence of spring 56.

To explain the manner in which system 10 controls the speed of a watercraft in which it is installed, the operation of servo motor 12 is first addressed. Initially it is noted that pivot 51 is positioned sufficiently proximate inner cable 52 so that any tension applied to inner cable 52 by system 10 is insufficient to move hand throttle 50. Thus, for a given position of the hand throttle 50, if servo motor 12 is operated to draw in cable 18, a stretching force will be imparted to cable 18 since hand throttle 50 will act as a fixed support. This stretching force will cause cable 18 to straighten between the buttress 36 and bracket 38 and consequently sheath 16 will straighten commensurately. This will result in sheath 16 pushing against bracket 38 to move the throttle lever 40 in a throttle opening direction, O. Conversely, if the servo 12 pays out cable 18, the cable 18 will be relaxed such that sheath 16 is free to increase its curvature and therefore allow bracket 38 to move in a throttle closing direction under the influence of spring 56.

In overview, system 10 controls the speed of a watercraft as follows. An operator activates system 10 from panel 30 and inputs a set speed to the controller from this panel; the operator may then accelerate the craft to close to the pre-set speed. During acceleration, the controller causes servo 12 to pay out some cable 18 in order to move abutment nut 46 to a pre-defined distance from bracket 38; this is felt by the operator as a lag in the acceleration. When the boat slightly exceeds the pre-set speed, the controller, which is input with an indication of the speed of the craft from sensors 24 and 26, sends the operator a signal it is taking over. Thereafter, the controller maintains the speed at the pre-set speed through appropriate signals to servo motor 12.

Water skiing competitions comprise the events of slalom, jump, and trick skiing. Slalom and jump skiing events mandate certain specific speeds for each run by the skier. Trick skiing does not have mandated speeds: the speed is instead at the election of the skier and these runs are generally performed at much slower speeds than slalom or jump events. Each run is of a precise length and is divided into two segments. For slalom and jump events, the time through each segment is measured. If the times indicate that the speed through a segment is not within a certain tolerance, the run does not qualify. Furthermore, for a "record class" event, the tolerances are tighter. In major competitions, timing is accomplished with an on-board timer which responds to a magnetic buoy at the start, at the end of the first segment, and at the finish. For lesser competitions, "official" times may be obtained with a stop watch and, for on-board timing, an operator may need to press a button on the on-board timer when the boat passes a marker for the start, the end of the first segment, and the finish.

Figure 2:
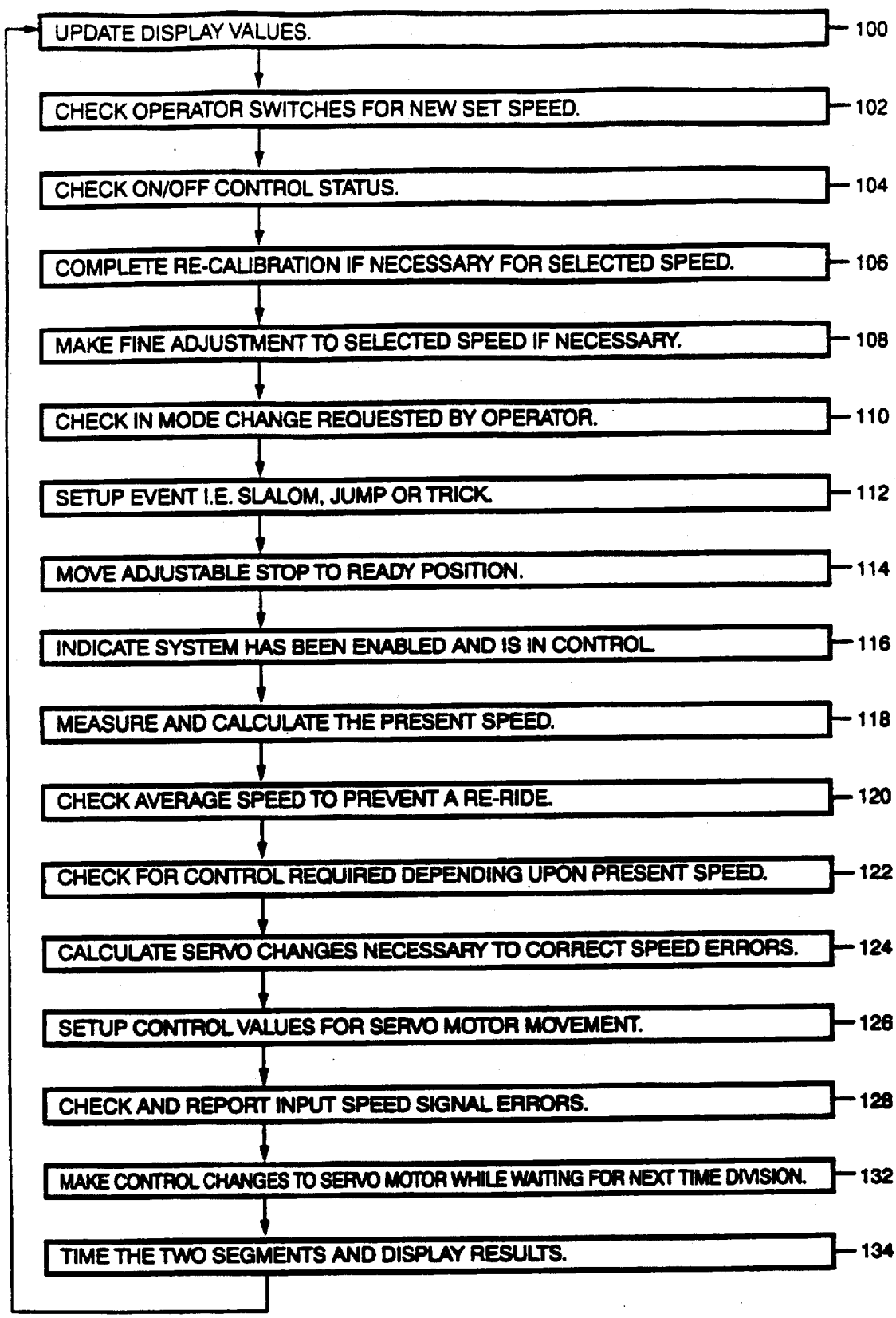
FIG. 2 is a flow diagram of the program control for the system of FIG. 1.

When system 10 is powered, the controller 20 loops through the software control program illustrated in block diagram form in FIG. 2. Referencing FIG. 2, as well as FIG. 1, during each loop of the software, the controller updates display 60 of panel 30 with any previously calculated indication of the current speed of the boat as well as with the last operator input set speed and the mode—i.e., slalom, jump, or trick and, for jump and slalom, regular or record class tolerances—(block 100). The controller then checks for a new set speed input by the operator (block 102). If the operator has switched the on/off button 62 to "off", the controller deactivates servo 12. If button 62 is switched to "on", the controller is enabled to control servo 12 (block 104). If the operator has pressed a certain selection of buttons 64, 66, and 68 to request re-calibration of the current set speed, the controller re-calibrates the set speed based on signals from timer 32 received during the previous run for that set speed (block 106). More particularly, a time signal is received by the controller from timer 32 at the end of each run segment. The controller has the regulation length of each segment available in memory. With this information, the controller may calculate the actual speed of the boat through the run. If this actual speed is different from the set speed, the controller applies a correction factor to the signals received from each speed sensor.

By pressing one of buttons 66 or 68, the operator may request a fine adjustment of the set speed, up or down, by 0.5 mph (block 108). Lastly, the operator may choose a new mode by an appropriate input via buttons 64, 66, and 68 (block 110). Since the mode determines the acceptable selections for the set speed as well as the speed tolerances, after the operator has input the mode and a particular set speed, the controller is ready to control the speed for the event (block 112).

When the current speed, as calculated by the controller, attains a pre-defined speed below the set speed (for example, 25 mph), the controller activates the servo motor to pay out cable 18 so that abutment nut 46 moves to a ready position a pre-defined distance from bracket 38 (block 114). The servo motor 12 allows the controller to accurately position the abutment nut 46 a known distance from bracket 38. The operator will sense the movement of the abutment nut 46 as a lag in acceleration as the hand throttle is pulled back.

When the boat has accelerated to a speed slightly greater than the pre-set speed, controller 20 senses an audible and/or visible indication to the operator indicating that it is now in control (block 116). This is a prompt to the operator to cease moving hand throttle 50. Utilising signals from the speed sensors 24, 26, the controller determines the current speed (block 118). Based on determinations of the current speed and signals from the timer 32 (which are recognised at block 134), the controller calculates the average speed for each segment of the present run (block 120). If the current speed deviates from the preset speed, or the average speed is outside of the necessary tolerances (block 122), the controller calculates the necessary servo changes to correct the speed errors (block 124). These changes are converted to control values for the servo (block 126) and sent to the servo to make the required adjustments (block 132).

The controller normally averages the signals received from the two speed sensors in determining the current speed. However, if the difference between these signals exceeds a pre-defined limit (indicating, for example, that one is clogged with seaweed), an error condition exists and the controller sends an error message to the display 60 (block 128).

The times for each of the two segments are measured by the controller 20 based upon start and stop timing signals from the timer 32. This timer can be either a manual push button or a magnetic buoy sensor. These times are displayed by the controller during execution of block 134. Once program control passes block 134, it returns to block 100. This program loop is executed several times per second.

When in control, controller 20 may cause the servo 12 to adjust the engine throttle lever 40 to a more open or more closed position. The maximum degree to which servo 12 may open throttle lever 40 is determined by the position of abutment nut 46. That is, once bracket 38 encounters the abutment nut, the servo 12 may not further move the engine throttle lever in a throttle opening position; thus the abutment nut acts as an adjustable stop. The abutment nut also allows an operator to overcome system 10 at any time by moving the hand throttle 50 toward a throttle closing position, as follows. Should hand throttle 50 be moved forward, servo 12 would attempt to compensate by closing the gap between bracket 38 and abutment nut 46. However, once this gap has closed, it is not possible for the servo 12 to compensate for further movement of the hand throttle 50 such that the operator may thereafter effectively close the throttle. Therefore, abutment nut 46 provides an important safety feature. Of course, an operator may also overcome system 10 by pressing the on/off button 62.

The rate at which servo 12 adjusts the engine throttle lever 40 depends upon the mode selected by the operator. Where jump mode is selected, speed corrections are very aggressive. This is due to the significantly larger forces on the boat imposed by the skier through a jump run.

While the present invention has been described in conjunction with its use with a water skier behind a boat, it will be appreciated that it also has application to other situations where it is desired to operate a boat at a constant speed. In addition, the system may be applied to other vehicles equipped with speed sensors.

Modifications will be apparent to those skilled in the art and, therefore, the invention is defined in the claims.

What is claimed is:

1. Apparatus for use in a vehicle speed controller, comprising:

an actuator;

a co-axial cable having an outer sheath for extending between a buttress and an engine throttle lever and an inner cable operatively associated with said actuator and extending through said sheath to a support positioned beyond said engine throttle lever; said outer sheath being relatively incompressible along its longitudinal axis and relatively flexible transversely of its longitudinal axis, said sheath having a length greater than the distance between said buttress and said engine throttle lever, at least when said engine throttle lever is in a closed throttle position; and a controller for receiving an input by a speed sensor and outputting a control signal to said actuator.

2. A watercraft speed controller, comprising:

an engine throttle lever;

an actuator;

a co-axial cable having an outer sheath extending between a buttress and said engine throttle lever and an inner cable operatively associated with said actuator and extending through said outer sheath to a support positioned beyond said engine throttle lever; said outer sheath being relatively incompressible along its longitudinal axis and relatively flexible transversely of its longitudinal axis, said sheath having a length greater than the distance between said buttress and said engine throttle lever, at least when said engine throttle lever is in a closed throttle position;

a water speed sensor; and a controller input by said water speed sensor and outputting a control signal to said actuator.

3. The controller of claim 2 including:

a hand throttle;

a hand throttle cable extending from said hand throttle and joined to said inner cable such that said hand throttle comprises said support.

4. The controller of claim 3 wherein said engine throttle lever is biased toward a throttle closing position.

5. The controller of claim 4 including an abutment supported on said inner cable at a side of said engine throttle lever remote from said sheath, said abutment for abutting said engine throttle lever when said inner cable is sufficiently retracted by said actuator.

6. The controller of claim 5 wherein said actuator is a servo motor.

7. A method for controlling the speed of a vehicle, comprising the following steps:

(a) accepting an operator input of a set speed when a current speed of said vehicle is less than said set speed;

(b) after accepting an operator input of a set speed, refraining from controlling the current speed of said vehicle while said current speed of said vehicle remains less than said set speed:

(c) when an engine throttle for said vehicle is opened by said operator and said vehicle reaches approximately said set speed, providing an indication to said operator; and (d) thereafter adjusting said engine throttle in order to maintain the speed of said vehicle within a pre-selected tolerance from said set speed.

8. The method of claim 7 wherein said step of adjusting said engine throttle comprises, when opening said engine throttle, opening said engine throttle by no more than a pre-determined amount beyond the amount said throttle is opened by said operator.

9. The method of claim 8 including the step of ceasing to adjust said engine throttle by opening said engine throttle whenever an operator adjustment is made, which, but for the action of step (d), would close said engine throttle by more than said predetermined amount.

10. The method of claim 7 wherein said step of adjusting said engine throttle comprises paying out, or drawing in, an inner cable through an outer sheath extending between a buttress and said engine throttle, said outer sheath of a type which is relatively incompressible along its longitudinal axis and relatively flexible transversely of its longitudinal axis, said outer sheath having a length greater than the distance between said buttress and said engine throttle lever.

11. The method of claim 10 including the step of, when an operator opens said engine throttle to accelerate a vehicle toward said pre-set speed, paying out said inner cable through said outer sheath.

12. The method of claim 9 wherein said step of adjusting said engine throttle comprises paying out, or drawing in, an inner cable through an outer sheath extending between a buttress and said engine throttle, said outer sheath of a type which is relatively incompressible along its longitudinal axis and relatively flexible transversely of its longitudinal axis, said outer sheath having a length greater than the distance between said buttress and said engine throttle lever.

13. The method of claim 7 including the step of determining the time taken for said vehicle to move a known distance when said vehicle is expected to be travelling within a preselected tolerance of a pre-set speed and re-calibrating a speed which is considered to be said pre-set speed based on said timing.

14. The method of claim 7 including the step of controlling the rate of adjustment of said engine throttle of step (d) based on an operator input.

* * * * *